B. E. WOOLEVER.
PIPE CLEARER.
APPLICATION FILED JULY 6, 1917.
1,293,604.
Patented Feb. 4, 1919.
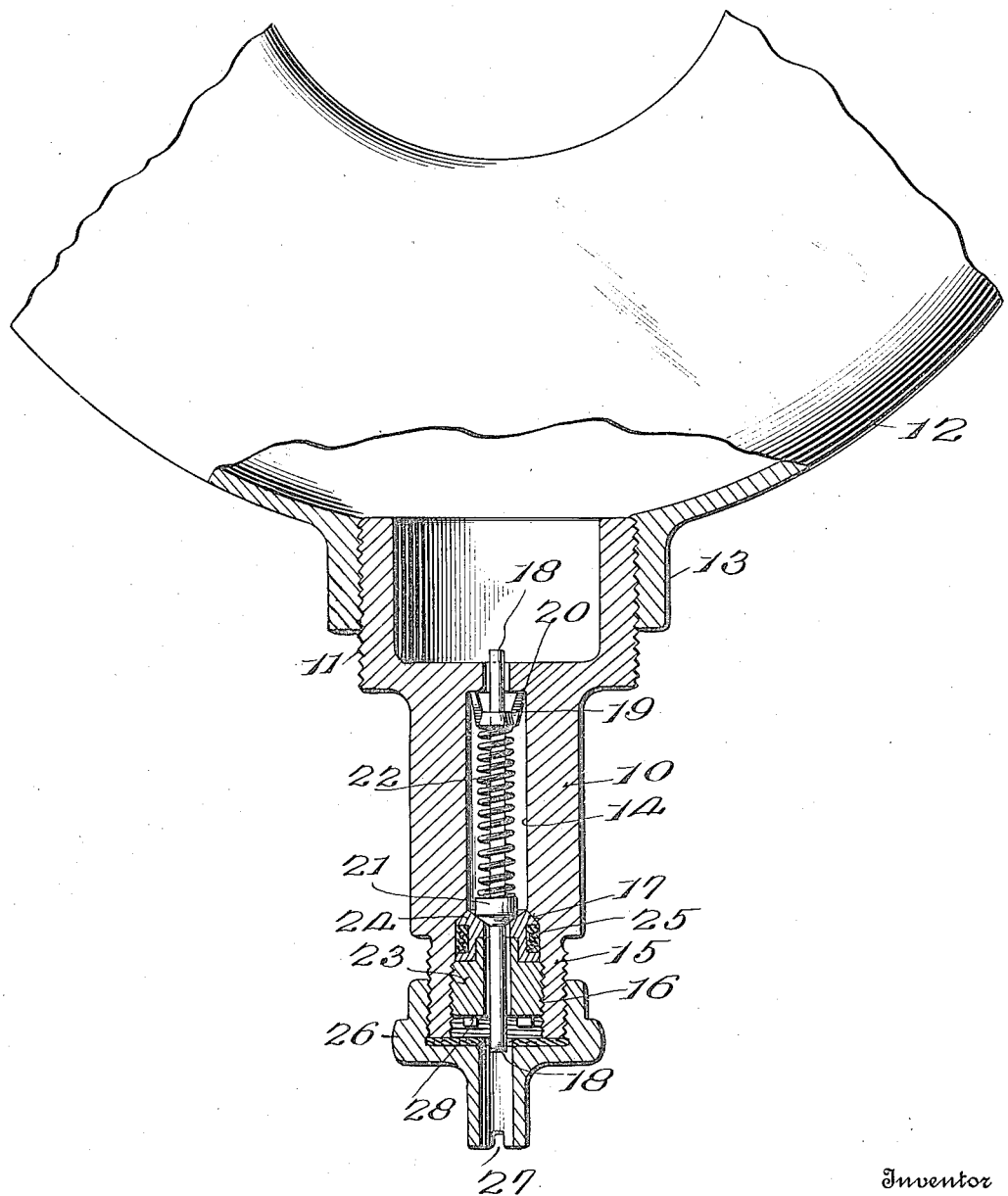
Inventor
B. E. Woolever.
By _____, Attorneys.

UNITED STATES PATENT OFFICE.

BURTON ED. WOOLEVER, OF BURWELL, NEBRASKA, ASSIGNOR OF ONE-HALF TO JOHN W. PARKIN, OF BURWELL, NEBRASKA.

PIPE-CLEARER.

1,293,604.  Specification of Letters Patent.  Patented Feb. 4, 1919.

Application filed July 6, 1917. Serial No. 179,011.

*To all whom it may concern:*

Be it known that I, BURTON ED. WOOLEVER, a citizen of the United States, residing at Burwell, in the county of Garfield and State of Nebraska, have invented certain new and useful Improvements in Pipe-Clearers, of which the following is a specification.

This invention relates to devices for removing obstructions from pipes and the like, and has for one of its objects to provide a simply constructed device which may be readily attached to the intake or outlet portion of a pipe and including a check valve and means for attaching a compressed air or steam conductor, to enable the force of the air or steam to be utilized to remove the obstruction.

With these and other objects in view, the invention consists in certain novel features of construction, as hereinafter shown and described and then specifically pointed out in the claim.

The improved device may be adapted for application to pipes or like conductors of various forms and sizes, and to pipes employed for various purposes, and it is not desired therefore to limit the invention to any specific form of conductor, but for the purpose of illustration the improved device is shown applied to a conventional trap device employed in connection with sinks, basins or the like, and in the drawings thus employed:

The figure is a side elevation of a portion of a trap partly in section, with the improved device applied and in longitudinal section.

The improved device comprises a stock represented as a whole at 10 and threaded at one end as shown at 11, and when applied to a trap, a portion of which is represented conventionally at 12, the threaded portion 11 of the body is engaged with the threaded draw-off portion 13 of the trap. The threaded portion 11 of the device will be adapted to fit the threaded portions of the device to which it is to be coupled, and may be varied to any required extent, or reducing and enlarging sleeves may be employed to enable the device to be coupled to various sizes and forms of pipes or other devices which may be clogged or obstructed. In the illustration, the inner end of the stock which is engaged in the trap or other pipe member is shown as having an enlarged chamber in which the pressure fluid may accumulate.

The body portion 10 of the device is provided with a longitudinal bore indicated at 14, and its outer portion reduced and externally threaded as shown at 15 and the reduced portion internally threaded as shown at 16 and with an outer stop shoulder 17 and an inner stop shoulder 20. Extending through the bore 14 is a stem 18 having a movable guide 19 bearing upon the inner shoulder 20. The stem 18 is slidable through the member 19 and is provided with a combined stop collar and valve 21 intermediate its ends. A spring 22 surrounds the stem and bears at its ends respectively against the valve 21 and the guide member 19. The stem 18 is provided with a threaded packing sleeve 23 engaging in the threaded portion 16 of the stock and with a sleeve 24 surrounding the stem and bearing upon the outer shoulder 17. The bore of the sleeve 24 is greater than the diameter of the stem 18, and said sleeve is surrounded with a yieldable packing 25 bearing against the walls of the bore 14. The spring 22 operates to maintain the valve 21 in engagement with the inner end of the sleeve 24 which thus serves as a seat for the valve 21. The stem 18 terminates normally inside the outer line of the reduced portion of the body 10, as shown. A protecting cap 26 engages over the externally threaded portion 15 of the reduced portion of the body, which is removed when the air or steam conductor is applied. The cap 26 is bored longitudinally to provide access to the outer end of the stem 18, and the outer end of the cap is provided with transverse notches 27 and the outer face of the packing sleeve 23 is provided with outwardly directed lugs 28 over which the notches 27 are placed after the cap has been removed to enable the sleeve 23 to be detached when required, or to enable the sleeve to be adjusted to increase or decrease the tension of the spring 22. By this means the force required to move the valve stem 18 inwardly is controlled.

When a pipe or conduit becomes clogged, the closure for the draw-off portion or the intake or outlet end of the conduit is removed and the threaded portion 11 of the member 10 is inserted in its place, thus coupling the body 10 to the pipe or conduit. The discharge end of an air pump or other means for producing pressure is then coupled to the reduced portion of the member 10 by connecting the same with the threads 15, the coupling member having the usual means for moving the stem 18 longitudinally to detach the valve 21 from engagement with the seat 24 and permit the compressed air to pass through the bore 14 of the body 10 and loosen the obstruction. It will be obvious that steam or other fluid or gas may be substituted for air if required. In cold weather when the obstruction is formed by freezing, steam or other heat imparting fluid or gas may be substituted for the air. The fluid which is admitted to the stock under pressure will emerge from the inner end of the bore thereof with considerable velocity as will be readily understood and will exert its force against the obstructions in the trap or pipe member so that it will tend to loosen and dislodge the obstruction. Should the obstruction be so extensive as to constitute a dam or bridge over the open inner end of the stock, the fluid will be turned back therefrom and will accumulate in the chamber at the inner end of the stock with a gradually increasing pressure and this accumulated fluid will, of course, exert its pressure against the obstruction in coöperation with the fluid emerging from the bore of the stock. The increasing pressure of the accumulating fluid, together with the momentum or velocity of the freshly admitted fluid will eventually loosen and dislodge the obstruction so that the liquid or gas admitted to the trap or pipe member in the usual manner will be permitted to carry it out to and through the usual outlet. Should the obstruction tend to disintegrate as it is removed, or prior to its removal, the enlarged chamber at the inner end of the stock will catch the particles so that they will not drop onto the floor of the room when the device is removed, but will be retained in said chamber from which they may be easily removed and deposited in any suitable receptacle or at any place of collection. The improved device is simple in construction, can be inexpensively manufactured and applied by any person without previous skill or knowledge.

Having thus described the invention, what is claimed as new is:

A device for the purpose set forth comprising a stock having a longitudinal bore and constructed at one end to be coupled to a hollow body and provided with an open ended chamber at said end, the bore of the stock being expanded at the end remote from said chamber, stop shoulders adjacent the inner end of the bore and at the base of the expanded portion thereof, a guide within the bore bearing upon the inner stop shoulder, a sleeve fitted in the expanded portion of the bore and abutting the stop shoulder at the base of the same, the inner end of the sleeve forming a valve seat, packing around said sleeve, a stem extending through said sleeve and the inner end of the stock, a valve on said stem seating on the inner end of said sleeve, and a spring bearing upon said valve to hold it normally seated.

In testimony whereof I affix my signature.

BURTON ED. WOOLEVER [L. S.]